May 27, 1930.  A. J. DAVIS  1,760,686
PASTEURIZING APPARATUS
Filed Jan. 19, 1928   2 Sheets-Sheet 1

Inventor
Albert J. Davis
By his Attorneys
Kenyon & Kenyon

May 27, 1930. A. J. DAVIS 1,760,686
PASTEURIZING APPARATUS
Filed Jan. 19, 1928 2 Sheets-Sheet 2

Inventor
Albert J. Davis
By his Attorneys
Kenyon & Kenyon

Patented May 27, 1930

1,760,686

UNITED STATES PATENT OFFICE

ALBERT J. DAVIS, OF NEW YORK, N. Y.

PASTEURIZING APPARATUS

Application filed January 19, 1928. Serial No. 247,822.

This inveniton relates to pasteurizing apparatus and more especially to apparatus such as disclosed in the patents to A. J. Davis, No. 1,578,267 of March 30, 1926, and No. 1,647,035 of October 25, 1927. The apparatus comprises a plurality of annularly arranged milk holders, each of which is provided with a water jacket. These holders are supported upon a frame which is rotatable about an axis central of the holders and in the central open space are arranged suitable pipes for circulating heated water through the jackets. The milk is pasteurized by being maintained at a temperature of about 145° F. through the means of heated water circulated through the jackets and is held at such temperature for approximately thirty minutes. During this treatment the frame is rotated so that when the milk has been treated a sufficient length of time the holder is in position to have the milk drained off. A stationary cover is provided for the apparatus and there is provided a water seal between the cover and the holders, thus preventing cold air coming in contact with the milk in the holders.

As the milk is poured into each holder, foam forms on its surface, which foam may not be maintained at the pasteurizing temperature while the milk is in the holder. The foam may be some 15° to 20° F. lower in temperature than the main body of the milk, and, therefore, may not be effectively pasteurized.

An object of this invention is to break down the foam and maintain the air above the surface of the milk at the pasteurizing temperature, so that complete pasteurization of the milk is effected.

According to the invention, means are provided for withdrawing air from under the cover, heating the same to at least the pasteurizing temperature and blowing the heated air into the foam formed on the milk in the holders. The force of the air breaks down the foam and the heat in the air insures a sufficiently high temperature over the surface of the milk that complete pasteurization of the milk is effected. Since the air is drawn from under the cover and returned thereto, only clean air is used and there is no opportunity for dust to be introduced into the milk.

Figure 1:
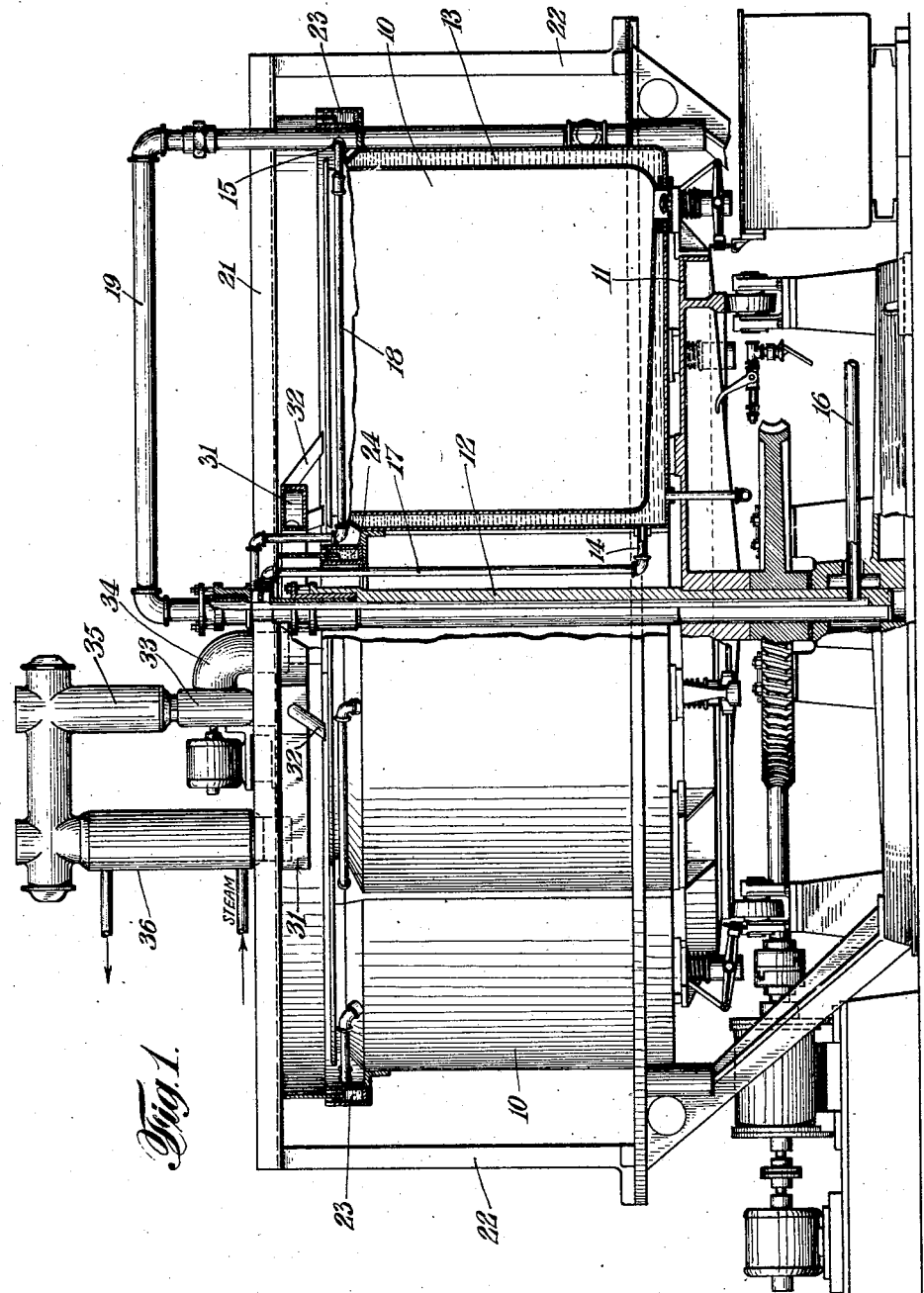
Figure 2:
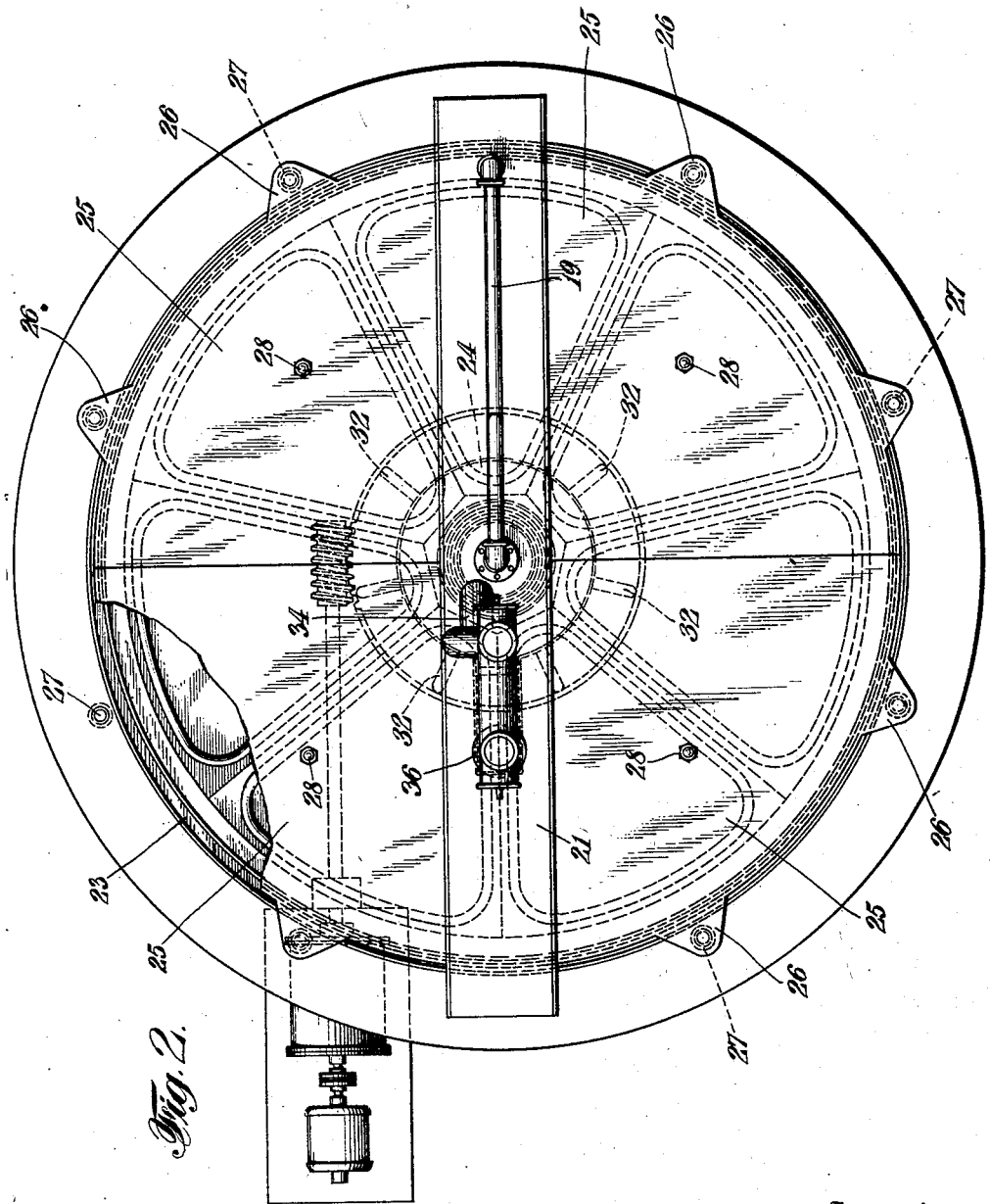

Other objects, novel features, and advantages of the invention will be apparent from the following specification and accompanying drawings, wherein Fig. 1 is a vertical section disclosing apparatus embodying the invention; and Fig. 2 is a plan view thereof.

A plurality of milk holders 10 are supported upon a platform 11 mounted upon a hollow shaft 12, the holders being symmetrically disposed around the axis of the shaft. Means similar to those described in detail in the aforementioned Patent No. 1,578,267 are provided for rotating the platform 11 and for supplying milk to be pasteurized to said holders and for drawing off pasteurized milk therefrom.

In order to maintain the milk in the holders 10 at the desired temperature, each of the holders is provided with a jacket 13 through which a heating fluid such as hot water may be circulated. Each jacket surrounds the sides and bottom of a holder 10, the heating liquid being preferably admitted to the jacket adjacent the bottom and inner end of the holder as shown at 14 and being drawn off from the jacket near the upper outer portion of the holder, as shown at 15. The heating fluid is supplied through a pipe 16 to the shaft 12 and travels upwardly through the hollow interior thereof. The heating fluid is led from the shaft 12 through the conduits 17 in the manner disclosed in the aforesaid patent to the jackets 13 and is conducted from the jackets through pipes 18 to a discharge pipe 19 in the manner disclosed in said patent. With this arrangement the heating fluid may be circulated through the jackets during rotation of the holders.

Across the top of the apparatus is provided a bridge 21 which is supported at its opposite ends by posts 22. This bridge is provided with a central aperture through which extend the circulation pipes for the heating fluid and the shaft 12. Surrounding the jackets 13 and supported thereby is a circular trough 23. A similar circular trough 24 is arranged in the inner space defined by the jackets 13 and is supported thereby. At either end of the bridge 21 and around the aperture through the bridge are provided dependent flanges extending into the troughs 23 and 24. A cover 25 is supported by the bridge 21 and preferably is made up of four sections, each section being independently hinged to one edge of the bridge. At the outer rim of each section is provided a curved depending flange extending into the trough 23. Each cover section is provided with one or more radially projecting extensions 26 adapated to rest upon supports 27 properly to position the flanges in the trough 23. The troughs 23 and 24 are normally filled with water so that with the flanges they form air-tight seals. In each cover section is provided a relief valve 28 for permitting air to pass outwardly from under the cover and preventing flow of air from the outside into the space under the cover. Preferably there is provided on the under surface of the cover a layer of heat insulating material, such for example as cork.

An annular pipe or duct 31 is supported by the bridge and is provided with obliquely directed nozzles 32 so arranged that the holders upon their rotation pass beneath the ends of the nozzles. 33 is a blower, the inlet of which communicates through a conduit 34 with the space between the cover and the top of the holders. The outlet of the blower 33 communicates through a conduit 35 with the annular duct 31. A steam jacket 36 surrounds a portion of the conduit 35. By means of this apparatus air is withdrawn from the space between the cover and the holders, and is heated at least to the pasteurization temperature, and then is blown against the surface of milk in the holders. Foam formed on the surface of the milk is broken down by the air currents and the surface of the milk is maintained at a sufficiently high temperature by the air currents that complete pasteurization of the entire body of milk is effected. As the air which is used to break up and heat the foam is air which has been drawn out from the space between the cover and the holders there is no chance of any dust or the like getting into the milk. The water seal between the cover and the holders prevents cold air getting in from the outside and also retains the heated air within the space beween the cover and the holders. The air circulated over the surface of the milk is maintained above pasteurizing temperature and prevents any condensate from forming on the under side of the cover and dropping back into the milk.

I claim:

1. A milk pasteurizing apparatus comprising a plurality of holders, a cover therefor, said cover and holders being mounted for rotation of one relative to the other and means for directing a current of heated air through foam on the surface of the milk in said holders.

2. A milk pasteurizing apparatus comprising a plurality of holders, a cover therefor, said cover and holders being mounted for rotation and one relative to the other, means for directing a current of heated air through foam on the surface of the milk in said holders, and means for establishing a seal between said cover and said holders.

3. A milk pasteurizing apparatus comprising a plurality of holders, a cover extending thereover, said cover and holders being mounted for rotation of one relative to the other, and means for withdrawing air from the space between said cover and holders, heating said air and directing the heated air under pressure over the surface of the milk contained in said holders.

4. A milk pasteurizing apparatus comprising a plurality of holders, a cover extending thereover, said cover and holders being mounted for rotation of one relative to the other, means for withdrawing air from the space between said cover and holders, heating said air and directing the heated air under pressure over the surface of the milk contained in said holders, and means for establishing a seal between said cover and said holders.

5. A milk pasteurizing apparatus comprising a plurality of holders, a cover extending thereover, said cover and holders being mounted for rotation of one relative to the other, means for establishing a seal between said cover and holders, an annular header between said cover and holders, nozzles leading from said header, a blower having its inlet communicating with the space below said cover and having its outlet communicating through a conduit with said header and heating means surrounding said conduit.

6. A milk pasteurizing apparatus comprising a plurality of holders, a cover extending thereover, said cover and holders being mounted for rotation of one relative to the other, means for establishing a seal between said cover and holders, a header supported below said cover, nozzles leading from said header and means for supplying heated air to said header.

7. In a milk pasteurizing apparatus, a plurality of rotatable holders, a stationary cover for said holders and means for supplying and directing a current of moist heated air under pressure over the surface of the milk contained in said holders thereby eliminating crystallization of the surface of the foam formed on the milk and preventing the formation of scum on the surface of the milk.

8. In a milk pasteurizing apparatus, a plurality of rotatable holders, a stationary cover for said holders, means for directing a current of heated air through foam on the surface of the milk in said holders, and means for establishing a seal between said cover and said holders.

In testimony whereof, I have signed my name to this specification.

ALBERT J. DAVIS.